(12) United States Patent
Watanabe et al.

(10) Patent No.: US 11,954,625 B2
(45) Date of Patent: Apr. 9, 2024

(54) VEHICLE DISPATCH SYSTEM, VEHICLE DISPATCH METHOD, SERVER, USER TERMINAL, AND STORAGE MEDIUM

(71) Applicant: TOYOTA JIDOSHA KABUSHIKI KAISHA, Toyota (JP)

(72) Inventors: Junya Watanabe, Sunto-gun (JP); Yuji Sasaki, Toyota (JP); Seiji Arakawa, Sunto-gun (JP); Naotoshi Kadotani, Sunto-gun (JP); Masafumi Hayakawa, Susono (JP); Takashi Hayashi, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 17/520,123

(22) Filed: Nov. 5, 2021

(65) Prior Publication Data

US 2022/0058954 A1 Feb. 24, 2022

Related U.S. Application Data

(63) Continuation of application No. 17/518,942, filed on Nov. 4, 2021, which is a continuation of application
(Continued)

(30) Foreign Application Priority Data

Aug. 7, 2017 (JP) ................................ 2017-152620

(51) Int. Cl.
*G06Q 10/0631* (2023.01)
*G05D 1/00* (2006.01)
(Continued)

(52) U.S. Cl.
CPC ....... *G06Q 10/06315* (2013.01); *G05D 1/021* (2013.01); *G06Q 10/02* (2013.01);
(Continued)

(58) Field of Classification Search
CPC ....... G06Q 10/06315; G06Q 10/06311; G06Q 50/30; G05D 1/021; G05D 2201/0213; G08G 1/202; G06F 3/04817
See application file for complete search history.

(56) References Cited

U.S. PATENT DOCUMENTS 6,636,145 B1 * 10/2003 Murakami ............. G07B 15/00
340/5.9
9,494,439 B1 11/2016 Ross et al.
(Continued)

FOREIGN PATENT DOCUMENTS

CN 105094767 A 11/2015
CN 105279681 A 1/2016
(Continued)

OTHER PUBLICATIONS

Notice of Allowance dated Mar. 2, 2022 in U.S. Appl. No. 16/848,164.
(Continued)

*Primary Examiner* — Thomas Ingram
(74) *Attorney, Agent, or Firm* — Sughrue Mion, PLLC

(57) ABSTRACT

A server includes a unit obtaining a position of a registered vehicle, a unit obtaining a vehicle dispatch position, a unit determining a candidate vehicle based on the vehicle dispatch position and the position of the registered vehicle, a unit transmitting information regarding an autonomous driving function of the candidate vehicle to a user device, a unit receiving information for identifying a dispatch vehicle, and a unit transmitting a vehicle dispatch position to the dispatch vehicle. The user device includes a unit receiving the information regarding the autonomous driving function of the candidate vehicle, a unit displaying the information regarding the autonomous driving function of the candidate vehicle, an unit accepting a user operation for selecting the
(Continued)

dispatch vehicle, and a unit transmitting the information for identifying the dispatch vehicle to the server.

9 Claims, 14 Drawing Sheets

Related U.S. Application Data

No. 16/848,164, filed on Apr. 14, 2020, now Pat. No. 11,373,126, which is a continuation of application No. 16/009,387, filed on Jun. 15, 2018, now Pat. No. 11,023,836.

(51) Int. Cl.
| | | |
|---|---|---|
| *G05D 1/02* | (2020.01) | |
| *G06F 3/04817* | (2022.01) | |
| *G06Q 10/02* | (2012.01) | |
| *G06Q 50/30* | (2012.01) | |
| *G07C 5/00* | (2006.01) | |
| *G07C 5/08* | (2006.01) | |
| *G08G 1/00* | (2006.01) | |

(52) U.S. Cl.
CPC ............ *G06Q 50/30* (2013.01); *G07C 5/008* (2013.01); *G07C 5/0808* (2013.01); *G08G 1/202* (2013.01); *G05D 2201/0213* (2013.01); *G06F 3/04817* (2013.01)

(56) References Cited

U.S. PATENT DOCUMENTS

| | | | |
|---|---|---|---|
| 10,647,297 B2 * | 5/2020 | Watanabe | B60R 25/2036 |
| 10,747,220 B2 * | 8/2020 | Uchida | B60W 10/20 |
| 10,768,636 B2 * | 9/2020 | Yamaguchi | G05D 1/0289 |
| 11,699,316 B2 * | 7/2023 | Skaaksrud | G06Q 10/083 |
| | | | 700/245 |
| 2014/0129951 A1 * | 5/2014 | Amin | G06Q 30/0635 |
| | | | 715/738 |
| 2015/0161832 A1 * | 6/2015 | Esselink | B60R 25/24 |
| | | | 340/5.22 |
| 2017/0008490 A1 * | 1/2017 | Sako | G07C 9/00571 |
| 2017/0075358 A1 | 3/2017 | Zhang | |
| 2018/0292829 A1 * | 10/2018 | Li | G06Q 50/30 |
| 2019/0108757 A1 * | 4/2019 | Watanabe | G08G 1/202 |

FOREIGN PATENT DOCUMENTS

| | | |
|---|---|---|
| JP | 2008-146500 A | 6/2008 |
| JP | 2014-065362 A | 4/2014 |
| JP | 2016-91411 A | 5/2016 |
| JP | 2016-115364 A | 6/2016 |
| JP | 2017-50855 A | 3/2017 |
| WO | 2015/151862 A1 | 10/2015 |

OTHER PUBLICATIONS

Office Action dated Jul. 20, 2023 issued in U.S. Appl. No. 17/518,942.
Notice of Allowance dated Nov. 7, 2023, issued in U.S. Appl. No. 17/518,942.

* cited by examiner

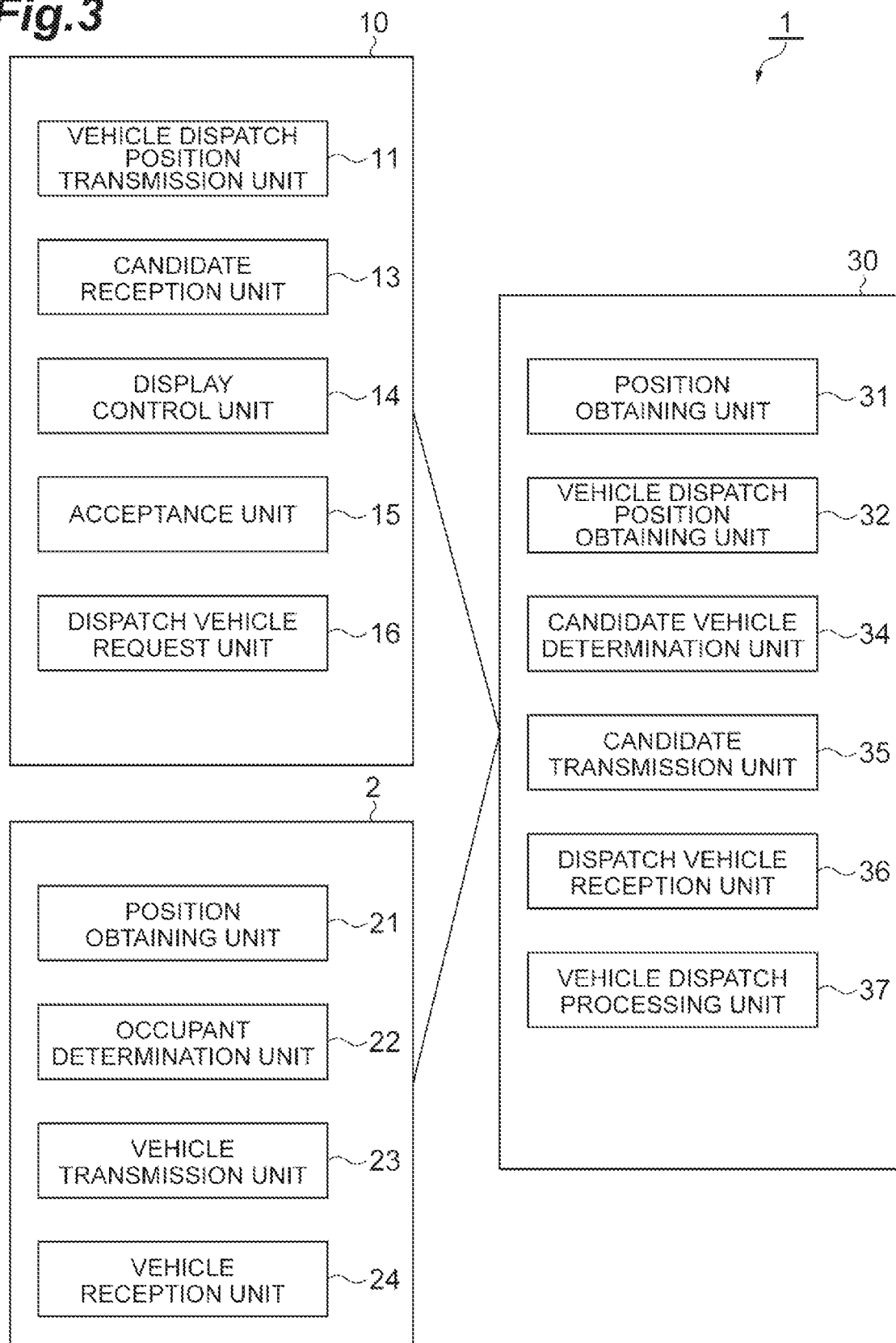

Fig.4

| VEHICLE IDENTIFICATION NUMBER | VEHICLE POSITION | DRIVING STATE | SEATING STATE OF DRIVER SEAT | PRESENCE OR ABSENCE OF AUTONOMOUS DRIVING FUNCTION | VERSION INFORMATION OF AUTONOMOUS DRIVING FUNCTION | OVERRIDE RATE (NUMBER OF TIMES PER km) | CONTINUITY OF AUTONOMOUS DRIVING | MAXIMUM VALUE OF CONTINUATION DISTANCE (MAXIMUM VALUE OF CONTINUATION TIME) OF AUTONOMOUS DRIVING | AVERAGE VALUE OF CONTINUATION DISTANCE (AVERAGE VALUE OF CONTINUATION TIMES) OF AUTONOMOUS DRIVING | CUMULATIVE VALUE OF CONTINUATION DISTANCE (CUMULATIVE VALUE OF CONTINUATION TIMES) OF AUTONOMOUS DRIVING |
|---|---|---|---|---|---|---|---|---|---|---|
| REGISTERED VEHICLE 2A | LATITUDE: XX LONGITUDE: XX | AUTONOMOUS DRIVING | PRESENCE | PRESENCE | 1.0 | 1 | 0.5 | 50 | 20 | 600 |
| REGISTERED VEHICLE 2B | LATITUDE: XX LONGITUDE: XX | MANUAL DRIVING | PRESENCE | ABSENCE | - | - | - | - | - | - |
| REGISTERED VEHICLE 2C | LATITUDE: XX LONGITUDE: XX | AUTONOMOUS DRIVING | ABSENCE | PRESENCE | 1.2 | 1 | 0.8 | 30 | 15 | 300 |
| REGISTERED VEHICLE 2D | LATITUDE: XX LONGITUDE: XX | MANUAL DRIVING | PRESENCE | PRESENCE | 1.2 | 5 | 0.7 | 30 | 10 | 100 |
| ...... | ...... | ...... | ...... | ...... | ...... | ...... | ...... | ...... | ...... | ...... |

VEHICLE DISPATCH SYSTEM, VEHICLE DISPATCH METHOD, SERVER, USER TERMINAL, AND STORAGE MEDIUM

CROSS-REFERENCE TO RELATED APPLICATION

This application is a continuation of U.S. patent application Ser. No. 17/518,942, filed Nov. 4, 2021, which is a continuation of U.S. patent application Ser. No. 16/848,164, filed Apr. 14, 2020, which is a continuation of U.S. patent application Ser. No. 16/009,387, filed Jun. 15, 2018, which claims priority from Japanese Patent Application No. 2017-152620 filed with Japan Patent Office on Aug. 7, 2017, the entire contents of which are hereby incorporated by reference.

TECHNICAL FIELD

The present disclosure relates to a vehicle dispatch system, a vehicle dispatch method, a server, a user device, and a storage medium.

BACKGROUND

United States Patent Application, Publication No. 2014/0129951 discloses a system that provides a vehicle dispatch service. This system accepts a dispatch vehicle request of a user through a mobile device of the user, and provides a dispatch vehicle to a vehicle dispatch position. The user can select the dispatch vehicle among a plurality of vehicles by using the mobile device.

SUMMARY

Incidentally, the user selects an autonomous driving vehicle as the dispatch vehicle in some cases. However, in the system described in United States Patent Application, Publication No. 2014/0129951, the user cannot determine whether or not a vehicle to be selected is the autonomous driving vehicle. In the present technology field, a vehicle dispatch system capable of selecting the autonomous driving vehicle as the dispatch vehicle is needed.

An aspect of the present disclosure is a vehicle dispatch system that includes a server, and a user device capable of communicating with the server. The server includes a storage unit configured to store information regarding autonomous driving functions of a plurality of registered vehicles, a position obtaining unit configured to obtain positions of the plurality of registered vehicles, a vehicle dispatch position obtaining unit configured to obtain a vehicle dispatch position from the user device, a candidate vehicle determination unit configured to determine at least one candidate vehicle among the plurality of registered vehicles based on the vehicle dispatch position and the positions of the plurality of registered vehicles, a candidate transmission unit configured to transmit information regarding an autonomous driving function of the at least one candidate vehicle in association with the at least candidate vehicle to the user device while referring to the storage unit, a dispatch vehicle reception unit configured to receive information for identifying a dispatch vehicle selected among the at least one candidate vehicle from the user device, and a vehicle dispatch processing unit configured to transmit the vehicle dispatch position to the dispatch vehicle. The user device includes a display unit, a vehicle dispatch position transmission unit configured to transmit the vehicle dispatch position to the server, a candidate reception unit configured to receive the information regarding the autonomous driving function of the at least one candidate vehicle in association with the at least one candidate vehicle from the server, a display control unit configured to display the information regarding the autonomous driving function of the at least one candidate vehicle received by the candidate reception unit in association with the at least one candidate vehicle, on the display unit, an acceptance unit configured to accept a user operation for selecting the dispatch vehicle among the at least one candidate vehicle, and a dispatch vehicle request unit configured to transmit the information for identifying the dispatch vehicle selected based on the user operation to the server.

According to this system, the information regarding the autonomous driving function of the at least one candidate vehicle is displayed in association with the at least one candidate vehicle, on the display unit of the user device. Thus, the user can determine the dispatch vehicle in consideration of the information regarding the autonomous driving function. Accordingly, this system can select the autonomous driving vehicle as the dispatch vehicle.

In one embodiment, the information regarding the autonomous driving function may include at least one of information among version information of the autonomous driving function, an override rate, continuity of autonomous driving, a maximum value of at least one of a continuation time and a continuation distance of the autonomous driving, an average value of at least one of the continuation time and the continuation distance of the autonomous driving, and a cumulative value of at least one of the continuation time and the continuation distance of the autonomous driving. With such a configuration, this system can present an index for determining the reliability of the autonomous driving vehicle to the user.

In one embodiment, the server further may include a generation unit configured to generate authentication information for authenticating combination of the user device that transmits the information for identifying the dispatch vehicle and the dispatch vehicle, and an authentication information transmission unit configured to transmit the authentication information generated by the generation unit to the user device that transmits the information for identifying the dispatch vehicle and the dispatch vehicle. The user device further may include an authentication information reception unit configured to receive the authentication information from the server, and a device authentication unit configured to authenticate the combination by using the authentication information received by the authentication information reception unit and the authentication information obtained from the dispatch vehicle. With such a configuration, the user device of this system can authenticate the combination of the dispatch vehicle and the user device by using the authentication information.

In one embodiment, the server may further include a generation unit configured to generate authentication information for authenticating the combination of the user device that transmits the information for identifying the dispatch vehicle and the dispatch vehicle, and an authentication information transmission unit configured to transmit the authentication information generated by the generation unit to the user device that transmits the information for identifying the dispatch vehicle and the dispatch vehicle, and the dispatch vehicle may authenticate the combination by using the authentication information obtained from the server and the authentication information obtained from the user device. With such a configuration, the dispatch vehicle can authenticate the combination of the dispatch vehicle and the user device by using the authentication information.

In one embodiment, the server may further include a determination unit configured to determine whether or not the dispatch vehicle at the time of dispatching the vehicle is a manned vehicle, the generation unit may generate information of the dispatch vehicle and information of a user without generating the authentication information when the determination unit determines that the dispatch vehicle at the time of dispatching the vehicle is the manned vehicle, and the authentication information transmission unit may transmit the information of the dispatch vehicle to the user device and may transmit the information of the user to the dispatch vehicle. This system can authenticate the combination between an occupant and the user when the dispatch vehicle at the time of dispatching the vehicle is the manned vehicle.

Another aspect of the present disclosure is a vehicle dispatch method performed by a vehicle dispatch system that includes a server and a user device capable of communicating with the server. The method includes causing the server to store information regarding autonomous driving functions of a plurality of registered vehicles in a storage unit of the server, causing the user device to transmit a vehicle dispatch position to the server, causing the server to obtain positions of the plurality of registered vehicles, causing the server to receive the vehicle dispatch position from the user device, causing the server to determine at least one candidate vehicle among the plurality of registered vehicles based on the vehicle dispatch position and the positions of the plurality of registered vehicles, causing the server to transmit information regarding an autonomous driving function of the at least one candidate vehicle in association with the at least one candidate vehicle to the user device while referring to the storage unit, causing the user device to receive the information regarding the autonomous driving function of the at least one candidate vehicle in association with the at least one candidate vehicle from the server, causing the user device to display the information regarding the autonomous driving function of the at least one candidate vehicle in association with the at least one candidate vehicle, on a display unit of the user device, causing the user device to accept a user operation for selecting a dispatch vehicle among the at least one candidate vehicle, causing the user device to transmit information for identifying the dispatch vehicle selected based on the user operation to the server, causing the server to receive the information for identifying the dispatch vehicle selected among the at least one candidate vehicle from the user device, and causing the server to transmit the vehicle dispatch position to the dispatch vehicle.

Still another aspect of the present disclosure is a server capable of communicating with a user device. The server includes a storage unit configured to store information regarding autonomous driving functions of a plurality of registered vehicles, a position obtaining unit configured to obtain positions of the plurality of registered vehicles, a vehicle dispatch position obtaining unit configured to obtain a vehicle dispatch position from the user device, a candidate vehicle determination unit configured to determine at least one candidate vehicle among the plurality of registered vehicles based on the vehicle dispatch position and the positions of the plurality of registered vehicles, a candidate transmission unit configured to transmit information regarding an autonomous driving function of the at least one candidate vehicle in association with the at least one candidate vehicle to the user device while referring to the storage unit, a dispatch vehicle reception unit configured to receive information for identifying a dispatch vehicle selected among the at least one candidate vehicle from the user device, and a vehicle dispatch processing unit configured to transmit the vehicle dispatch position to the dispatch vehicle.

Still another aspect of the present disclosure is a user device capable of communicating with a server. The user device includes a display unit, a vehicle dispatch position transmission unit configured to transmit a vehicle dispatch position to the server, a candidate reception unit configured to receive information regarding an autonomous driving function of at least one candidate vehicle in association with the at least one candidate vehicle from the server, a display control unit configured to display the information regarding the autonomous driving function of the at least one candidate vehicle received by the candidate reception unit in association with the at least one candidate vehicle, on the display unit, an acceptance unit configured to accept a user operation for selecting a dispatch vehicle among the at least one candidate vehicle, and a dispatch vehicle request unit configured to transmit information for identifying the dispatch vehicle selected based on the user operation to the server.

Still another aspect of the present disclosure is a server program executed by a server capable of communicating with a user device. The server program causes the server to function as a storage unit configured to store information items regarding autonomous driving functions of a plurality of registered vehicles, a position obtaining unit configured to obtain positions of the plurality of registered vehicles, a vehicle dispatch position obtaining unit configured to obtain a vehicle dispatch position from the user device, a candidate vehicle determination unit configured to determine at least one candidate vehicle among the plurality of registered vehicles based on the vehicle dispatch position and the positions of the plurality of registered vehicles, a candidate transmission unit configured to transmit information regarding an autonomous driving function of the at least one candidate vehicle in association with the at least one candidate vehicle to the user device while referring to the storage unit, a dispatch vehicle reception unit configured to receive information for identifying a dispatch vehicle selected among the at least one candidate vehicle from the user device, and a vehicle dispatch processing unit configured to transmit the vehicle dispatch position to the dispatch vehicle.

Still another aspect of the present disclosure is a non-transitory computer-readable storage medium configured to store the server program.

Still another aspect of the present disclosure is a user device program executed by a user device capable of communicating with a server. The user device program causes the user device to function as a vehicle dispatch position transmission unit configured to transmit a vehicle dispatch position to the server, a candidate reception unit configured to receive information regarding an autonomous driving function of at least one candidate vehicle in association with the at least one candidate vehicle from the server, a display control unit configured to display information regarding an autonomous driving function of the at least one candidate vehicle received by the candidate reception unit in association with the at least one candidate vehicle, on a display unit of the user device, an acceptance unit configured to accept a user operation for selecting a dispatch vehicle among the at least one candidate vehicle, and a dispatch vehicle request unit configured to transmit information for identifying the dispatch vehicle selected based on the user operation to the server.

Still another aspect of the present disclosure is a non-transitory computer-readable storage medium configured to store the user device program.

The vehicle dispatch method, the server, the user device, the server program, the user device program, and the storage medium have the same effects of the vehicle dispatch system.

According to various aspects of the present disclosure, a vehicle dispatch system capable of selecting an autonomous driving vehicle as a dispatch vehicle is provided.

BRIEF DESCRIPTION OF THE DRAWINGS

FIG. 3 is a block diagram showing an example of a function of the vehicle dispatch system.

FIG. 4 is an example of data retained by a server.

DETAILED DESCRIPTION

Hereinafter, illustrative embodiments will be described with reference to the drawings. In the following description, the same or equivalent elements will be assigned the same references, and the redundant description will not be repeated.

First Embodiment (Vehicle Dispatch System)

Figure 1:
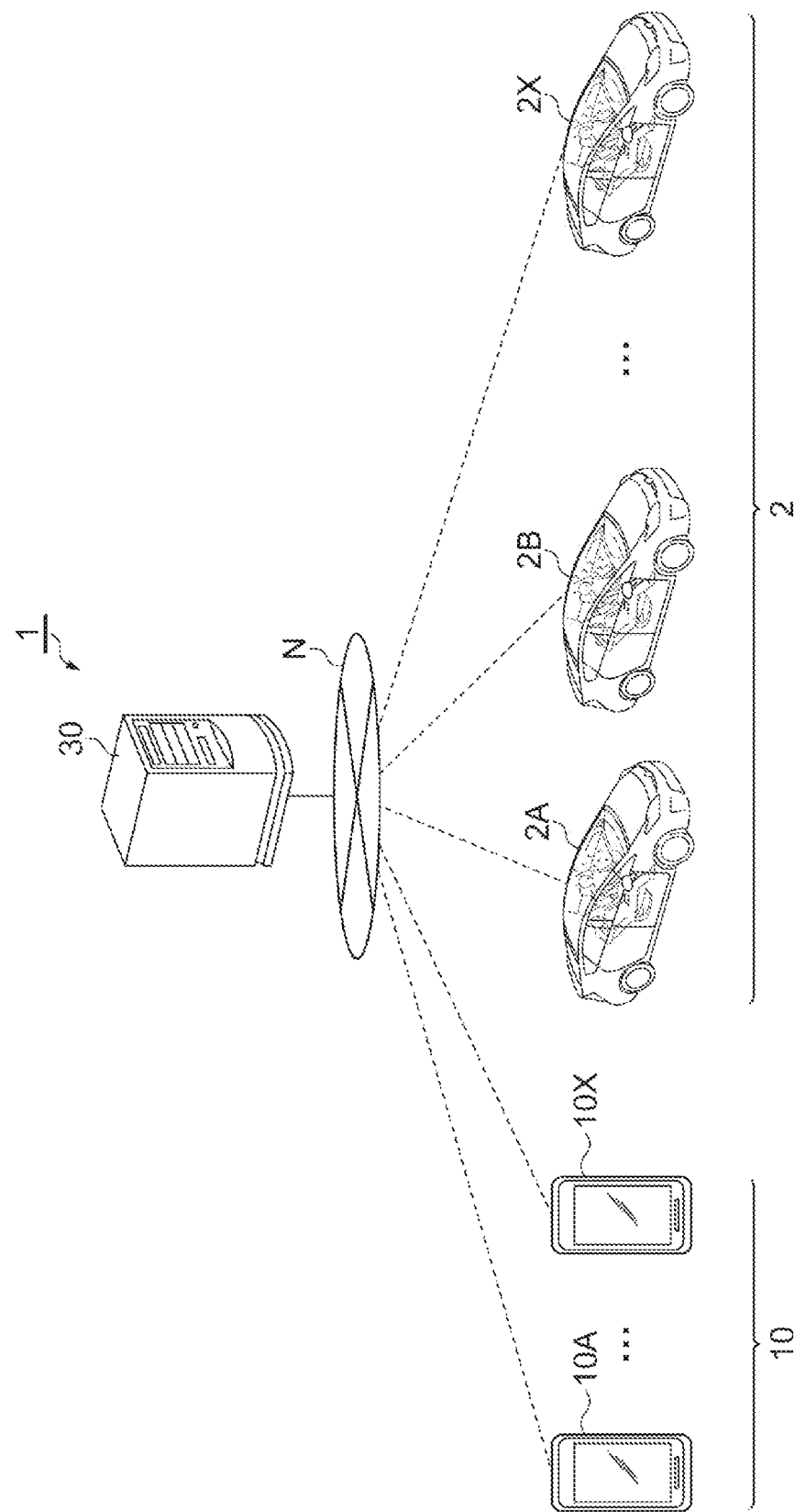
FIG. 1 is a diagram showing an example of a configuration of a vehicle dispatch system according to a first embodiment.

FIG. 1 is a diagram showing an example of a configuration of a vehicle dispatch system 1 according to a first embodiment. As shown in FIG. 1, the vehicle dispatch system 1 includes a plurality of user devices 10A, ..., and 10X, and a server 30. The plurality of user devices 10A, ..., and 10X is connected so as to communicate with the server 30 via a network N. The network N is, for example, a wireless communication network.

The plurality of user devices 10A, ..., and 10X is devices of users. The users are users who use the vehicle dispatch system 1. The users may be registered in the vehicle dispatch system 1 in advance. IDs for identifying the users may be allocated to the registered users. The plurality of user devices 10A, ..., and 10X may have the same configuration. Hereinafter, a user device 10 is described as a representative of these user devices when the configuration common to the user devices is described.

A plurality of vehicles 2A, 2B, ..., and 2X is connected so as to communicate with the server 30 through the network N. The plurality of vehicles 2A, 2B, ..., and 2X is registered in the vehicle dispatch system 1 in advance. IDs (vehicle identification numbers) for identifying the vehicles may be allocated to the registered vehicles. The plurality of vehicles 2A, 2B, ..., and 2X includes at least an autonomous driving vehicle. The autonomous driving vehicle is a vehicle on which an autonomous driving system which causes the vehicle to automatically travel toward a preset destination is mounted. The destination may be set by an occupant such as a driver, or may be automatically set by the autonomous driving system. The autonomous driving vehicle does not require the driver to perform a driving operation, and automatically travels. The plurality of vehicles 2A, 2B, ..., and 2X may have the same configuration except for the presence or absence of an autonomous driving function. Hereinafter, a vehicle 2 is described as a representative of these vehicles when the configuration common to the vehicles is described.

(Hardware Configuration of Vehicle Dispatch System)

Figure 2:
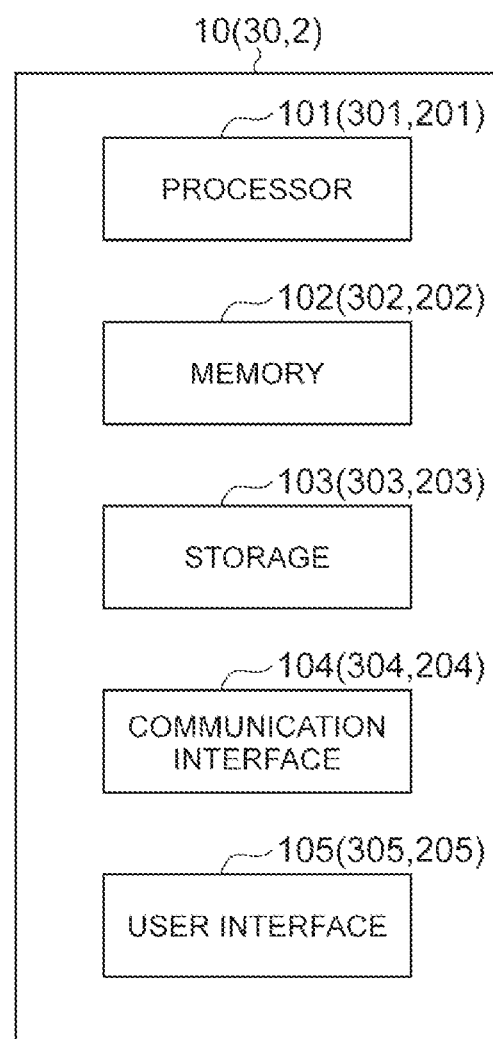
FIG. 2 is a diagram showing an example of a hardware configuration of a user device.

FIG. 2 is a diagram showing an example of a hardware configuration of the user device 10. As shown in FIG. 2, the user device 10 includes a processor 101, a memory 102, a storage 103, a communication interface 104, and a user interface 105 (an example of a display unit), and is a general computer.

The processor 101 is an arithmetic and logic unit such as a central processing unit (CPU). The memory 102 is a storage medium such as a read only memory (ROM) or a random access memory (RAM). The storage 103 is a storage medium such as a hard disk drive (HDD). The communication interface 104 is a communication device that realizes data communication. The user interface 105 is an output device such as liquid crystal or a speaker and an input device such as a touch panel or a microphone. The processor 101 generally manages the memory 102, the storage 103, the communication interface 104, and the user interface 105, and realizes functions of the user device to be described below. The user device 10 may include a global positioning system (GPS) receiving device.

Similarly to the user device 10, the server 30 includes a processor 301, a memory 302, a storage 303 (an example of a storage unit), a communication interface 304, and a user interface 305. The processor 301 generally manages the memory 302, the storage 303, the communication interface 304, and the user interface 305, and realizes functions of the server 30 to be described below.

The vehicles 2 includes an electronic control unit (ECU). Similarly to the user device 10, the ECU includes a processor 201, a memory 202, a storage 203, a communication interface 204, and a user interface 205. The processor 201 generally manages the memory 202, the storage 203, the communication interface 204, and the user interface 205, and realizes functions of the vehicles 2 to be described below. The vehicle 2 may include a GPS receiving device.

When the vehicle 2 is the autonomous driving vehicle, the vehicle may have the general configuration of the autonomous driving vehicle such as a sensor (not shown).

(Functions of Vehicle Dispatch System)

FIG. 3 is a block diagram showing an example of the functions of the vehicle dispatch system 1. As shown in FIG. 3, the user device 10 includes a vehicle dispatch position transmission unit 11, a candidate reception unit 13, a display control unit 14, an acceptance unit 15, and a dispatch vehicle request unit 16.

The vehicle dispatch position transmission unit 11 transmits a vehicle dispatch position to the server 30. The vehicle dispatch position transmission unit 11 is mainly realized by the processor 101 that operates the communication interface 104 while referring to the memory 102 and the storage 103. The vehicle dispatch position is a position in which a dispatch vehicle is to be dispatched, and is a position in which the user gets on the vehicle. For example, the vehicle dispatch position is specified by a user operation. For example, a position in which the user performs an operation for tapping their finger on a map displayed on the user interface 105 of the user device 10 becomes the vehicle dispatch position. The vehicle dispatch position may be determined based on a position of the GPS receiving device included in the user device 10.

The candidate reception unit 13 receives information regarding the autonomous driving function of at least one candidate vehicle in association with the at least one candidate vehicle from the server 30. The candidate reception unit 13 is mainly realized by the processor 101 that operates the communication interface 104 while referring to the memory 102 and the storage 103. The candidate vehicles are vehicles as candidates of the dispatch vehicle. The information regarding the autonomous driving function is information regarding the ability or reliability of autonomous driving. As a specific example of the information regarding the autonomous driving function, the presence or absence of the autonomous driving function, dimension information, and autonomous driving history. The details of the information regarding the autonomous driving function will be described below. The "candidate reception unit receives information regarding the autonomous driving function of at least one candidate vehicle in association with the at least one candidate vehicle" means that the candidate reception unit receives the information so as to determine which candidate vehicle is the information regarding the autonomous driving function such as information of the first candidate vehicle and information of the second candidate vehicle. For example, the candidate reception unit 13 receives a vehicle identification number of the candidate vehicle in association with the information regarding the autonomous driving function.

The display control unit 14 displays the information regarding the autonomous driving function of at least one candidate vehicle received by the candidate reception unit 13 in association with at least one candidate vehicle on the user interface 105. The display control unit 14 is mainly realized by the processor 101 that operates the user interface 105 while referring to the memory 102 and the storage 103. The "display control unit displays the information regarding the autonomous driving function of at least one candidate vehicle received by the candidate reception unit on the user interface 105" means that the display control unit displays the information regarding the autonomous driving function such that the user can visually perceive which candidate vehicle is the information regarding the autonomous driving function. For example, the display control unit 14 displays icons of the candidate vehicle together with the map on the user interface 105, and displays the information item regarding the autonomous driving function in association with the icon. For example, the display control unit 14 may display a balloon on the icon of the candidate vehicle, and may display the information regarding the autonomous driving function. Alternatively, the user performs an operation for selecting the icon of the candidate vehicle (for example, tap operation), and thus, the display control unit 14 may display the information regarding the autonomous driving function. Alternatively, the display control unit 14 may display the vehicle identification number of the candidate vehicle in association with the information regarding the autonomous driving function.

The acceptance unit 15 accepts a user operation for selecting the dispatch vehicle from at least one candidate vehicle. The acceptance unit 15 is mainly realized by the processor 101 that operates the user interface 105 while referring to the memory 102 and the storage 103. The user operation for selecting the dispatch vehicle is, for example, an operation for tapping the candidate vehicle displayed on the user interface 105.

The dispatch vehicle request unit 16 transmits the information identifying the dispatch vehicle selected based on the user operation to the server. The dispatch vehicle request unit 16 is mainly realized by the processor 101 that operates the communication interface 104 while referring to the memory 102 and the storage 103. The information for identifying the dispatch vehicle is information capable of specifying the dispatch vehicle, and is, for example, the vehicle identification number.

As stated above, in the user device 10, the candidate vehicle together with the information regarding the autonomous driving function is displayed, and the dispatch vehicle is determined based on the user operation.

The server 30 includes a position obtaining unit 31, a vehicle dispatch position obtaining unit 32, a candidate vehicle determination unit 34, a candidate transmission unit 35, a dispatch vehicle reception unit 36, and a vehicle dispatch processing unit 37.

The storage 303 of the server 30 stores the information items of the autonomous driving functions of the plurality of registered vehicles. The registered vehicles are vehicles registered in the vehicle dispatch system 1 in advance. The vehicle identification numbers are allocated to the registered vehicles. The vehicle identification numbers are the IDs for identifying the vehicles. The vehicle identification number may be a number which is allocated in association with a vehicle specific number (a vehicle number described on a license plate, a vehicle body number engraved on a vehicle body, or a physical address allocated to a communication device) by the vehicle dispatch system 1, or may be the vehicle specific number.

FIG. 4 is an example of data retained in the server 30. As shown in FIG. 4, the storage 303 stores a current vehicle position, a current driving state, a current seating state of a driver seat in association with the vehicle identification number. The vehicle position is a position on the map, and is, for example, longitude and latitude. The driving state is any one of the autonomous driving and manual driving. These information items are obtained from the vehicle 2 or a communication infrastructure on a road.

The storage 303 stores the information regarding the autonomous driving function in association with the vehicle identification number. As an example of the information regarding the autonomous driving function, there are the presence or absence of the autonomous driving function, version information of the autonomous driving function, an override rate, the continuity of the autonomous driving, a maximum value of a continuation distance of the autonomous driving (or a maximum value of a continuation time), an average value of the continuation distance of the autonomous driving (or an average value of the continuation time), and a cumulative value of the continuation distance of the autonomous driving (or a cumulative value of the continuation time.

The presence or absence of the autonomous driving function indicates whether or not the autonomous driving can be performed, and indicates information for determining whether or not the vehicle can be performed the autonomous driving. The version information of the autonomous driving function is version information of the autonomous driving system. An override is the driver's operation intervention during the autonomous driving. The override rate is the number of times overrides occur per unit distance. For example, a case where the override rate is "1 (number of times per km) means that one override per km occurs. The continuity of the autonomous driving is an index for evaluating a length from the start to the end of the autonomous driving. For example, the continuity is a ratio of the continuation distance of the autonomous driving to a total traveling distance in the autonomous driving. For example, when the continuation distance of the autonomous driving is 50 km out of 100 km which is the total traveling distance in the autonomous driving, the continuity is 0.5. These information items or original information items of these information items are obtained from the vehicle 2, and are updated in a predetermined timing.

In FIG. 4, for example, vehicle identification number "2A" is associated with vehicle position "longitude: XX, latitude: XX", driving state "autonomous driving", seating state of driver seat "presence", autonomous driving function "presence", version information "1.0", override rate "1", continuity "0.5", maximum value of continuation distance "50 km", average value of continuation distance "20 km", and cumulative value of continuation distance "600 km". Vehicle identification number "2B" is associated with vehicle position "longitude: XX, latitude: XX", driving state "manual driving", seating state of driver seat "presence", autonomous driving function "absence", version information "Null", override rate "Null", continuity "Null", maximum value of continuation distance "Null", average value of continuation distance "Null", and cumulative value of continuation distance "Null". Vehicle identification number "2C" is associated with vehicle position "longitude: XX, latitude: XX", driving state "autonomous driving", seating state of driver seat "absence", autonomous driving function "presence", version information "1.2", override rate "1", continuity "0.8", maximum value of continuation distance "30 km", average value of continuation distance "15 km", and cumulative value of continuation distance "300 km". Vehicle identification number "2D" is associated with vehicle position "longitude: XX, latitude: XX", driving state "manual driving", seating state of driver seat "presence", autonomous driving function "presence", version information "1.2", override rate "5", continuity "0.7", maximum value of continuation distance "30 km", average value of continuation distance "10 km", and cumulative value of continuation distance "100 km".

The position obtaining unit 31 obtains positions of the plurality of registered vehicles. The position obtaining unit 31 is mainly realized by the processor 301 that operates the communication interface 304 while referring to the memory 302 and the storage 303. The positions of the registered vehicles can be obtained from the vehicle 2 through communication. When the positions of the registered vehicles are received, the position obtaining unit 31 updates the vehicle positions stored in the storage 303.

The vehicle dispatch position obtaining unit 32 receives the vehicle dispatch position from the user device 10. The vehicle dispatch position obtaining unit 32 is mainly realized by the processor 301 that operates the communication interface 304 while referring to the memory 302 and the storage 303.

The candidate vehicle determination unit 34 determines at least one candidate vehicle from the plurality of registered vehicles based on the vehicle dispatch position and the positions of the plurality of registered vehicles. The candidate vehicle determination unit 34 is realized by the processor 301 that performs arithmetic processing while referring to the memory 302 and the storage 303. The candidate vehicle determination unit 34 determines at least one candidate vehicle among the plurality of registered vehicles based on distances between the vehicle dispatch position and the positions of the plurality of registered vehicles. For example, the candidate vehicle is the registered vehicle positioned within a predetermined distance range from the vehicle dispatch position. In the determination of the candidate vehicle, various conditions such as vehicle type and arrival time may be added.

The candidate transmission unit 35 transmits the information regarding the autonomous driving function of at least one candidate vehicle in association with at least one candidate vehicle to the user device 10 while referring to the storage 303. The candidate transmission unit 35 is mainly realized by the processor 301 that operates the communication interface 304 while referring to the memory 302 and the storage 303. The "candidate transmission unit transmits the information regarding the autonomous driving function of at least one candidate vehicle in association with at least one candidate vehicle to the user device while referring to the storage" means that the candidate reception unit transmits the information so as to determine which candidate vehicle is the information regarding the autonomous driving function such as information of the first candidate vehicle and information of the second candidate vehicle. As shown in FIG. 4, the information regarding the autonomous driving function is stored in associated with the vehicle identification number in the storage 303. For example, the candidate transmission unit 35 reads the information regarding the autonomous driving function corresponding to the vehicle identification number of the candidate vehicle, associates the vehicle identification number of the candidate vehicle with the information regarding the autonomous driving function, and transmits the associated information to the user device 10.

The dispatch vehicle reception unit 36 receives the information for identifying the dispatch vehicle selected among at least one candidate vehicle from the user device 10. The dispatch vehicle reception unit 36 is mainly realized by the processor 301 that operates the communication interface 304 while referring to the memory 302 and the storage 303. For example, the dispatch vehicle reception unit 36 receives the vehicle identification number of the dispatch vehicle from the user device 10.

The vehicle dispatch processing unit 37 transmits the vehicle dispatch position to the dispatch vehicle. The vehicle dispatch processing unit 37 is mainly realized by the processor 301 that operates the communication interface 304 while referring to the memory 302 and the storage 303. The vehicle dispatch processing unit 37 may transmit information of the user who requests the dispatch vehicle together with the vehicle dispatch position.

As stated above, the server 30 presents the information of the autonomous driving function of the candidate vehicle to the user while integrating and updating the information of the registered vehicle. The server 30 can dispatch the dispatch vehicle selected by the user to the vehicle dispatch position.

The vehicle 2 includes a position obtaining unit 21, an occupant determination unit 22, a vehicle transmission unit 23, and a vehicle reception unit 24.

The position obtaining unit 21 obtains the position of the vehicle 2 on the map. The position obtaining unit 21 is mainly realized by the processor 201 operated based on the information obtained from the GPS receiving device.

The occupant determination unit 22 determines whether or not an occupant is seated on a driver seat of the vehicle 2. The occupant determination unit 22 is mainly realized by the processor 201 operated based on information obtained from a seat sensor of the driver seat.

The vehicle transmission unit 23 transmits information to the server 30. The vehicle transmission unit 23 is mainly realized by the processor 201 that operates the communication interface 204 while referring to the memory 202 and the storage 203. The transmission information includes the position of the vehicle 2, the driving state, the seating state of the driver seat, and the information regarding the autonomous driving function.

The vehicle reception unit 24 receives information from the server 30. The vehicle reception unit 24 is mainly realized by the processor 201 that operates the communication interface 204 while referring to the memory 202 and the storage 203. The reception information includes the vehicle dispatch position. The reception information may include the information of the user who requests the dispatch vehicle.

As stated above, the vehicle 2 transmits the information regarding the autonomous driving function to the server 30. The vehicle 2 receives the vehicle dispatch position, and moves toward the vehicle dispatch position. When the vehicle 2 has the autonomous driving function and travels in the autonomous driving, the received vehicle dispatch position is set as a destination.

Screen Example

Figure 5:
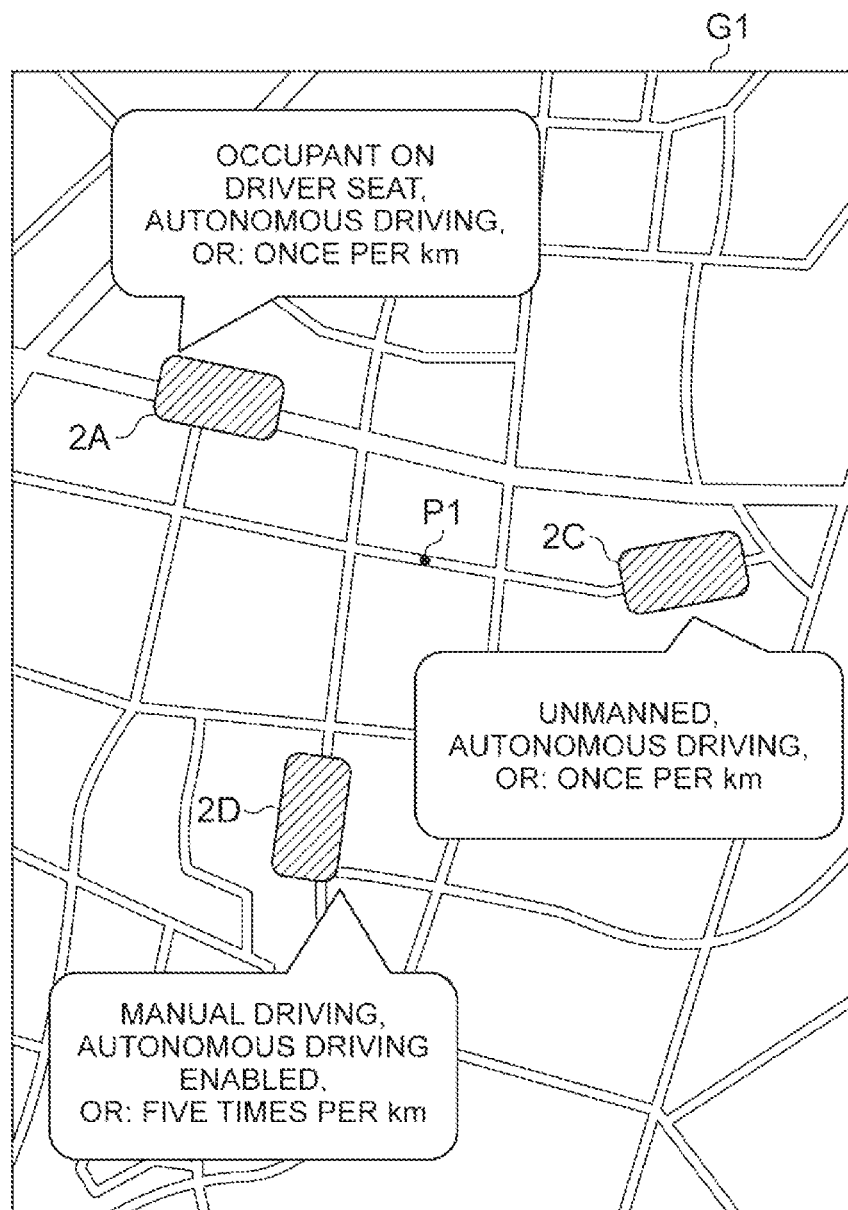
FIG. 5 is a screen example of a user device on which an override rate of a candidate vehicle is displayed.

FIG. 5 is a screen example G1 of the user device 10 on which the override rate of the candidate vehicle is displayed. As shown in FIG. 5, the display control unit 14 displays the map. The display control unit 14 adjusts the display of the map so as to display the vehicle dispatch position P1 in a screen center. The display control unit 14 displays the candidate vehicle received from the server 30. Here, three candidate vehicles on the map are displayed. The display control unit 14 provides the balloons to the icons of the candidate vehicles, and displays the information items regarding the autonomous driving functions. For example, as the information regarding the autonomous driving, "occupant on driver seat, autonomous driving, OR (override rate): once per km" is displayed in the balloon of the vehicle 2A which is the candidate vehicle. As the information regarding the autonomous driving, "unmanned, autonomous driving, OR (override rate): once per km" is displayed in the balloon of the vehicle 2C which is the candidate vehicle. As the information regarding the autonomous driving, "manual driving, autonomous driving enabled, OR (override rate): five times per km" is displayed in the balloon of the vehicle 2D which is the candidate vehicle. The user can select the vehicle as the dispatch vehicle matching the needs while referring to the information regarding the autonomous driving function. Although it has been described on the screen example G1 that all the candidate vehicles have the autonomous driving functions, the candidate vehicle having no autonomous driving function may be displayed.

Figure 6:
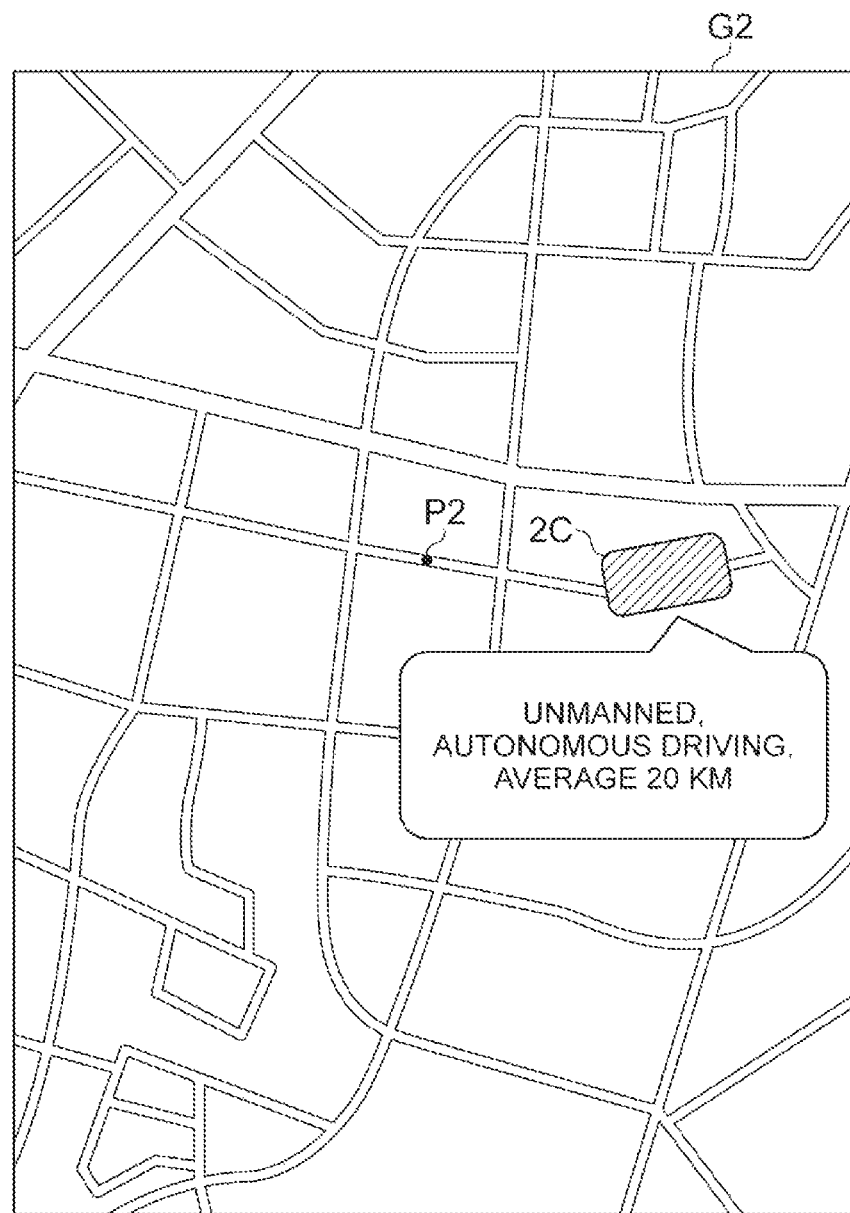
FIG. 6 is a screen example of the user device on which an average autonomous driving distance of the candidate vehicle is displayed.

FIG. 6 is a screen example G2 of the user device 10 on which an average autonomous driving distance of the candidate vehicle is displayed. As shown in FIG. 6, the display control unit 14 displays the map. The display control unit 14 adjusts the display of the map so as to display a vehicle dispatch position P2 in the screen center. The display control unit 14 display the candidate vehicle received from the server 30. Here, one candidate vehicle is displayed on the map. The display control unit 14 provides the balloons to the icons of the candidate vehicles, and displays the information items regarding the autonomous driving functions. For example, as the information regarding the autonomous driving, "unmanned, autonomous driving, average 20 km" is displayed in the balloon of the vehicle 2C which is the candidate vehicle. The average 20 km means an average autonomous driving distance. Although it has been described on the screen example G2 that the candidate vehicle has the autonomous driving function, the candidate vehicle having no autonomous driving function may be displayed.

(Vehicle Dispatch Process)

Figure 7:
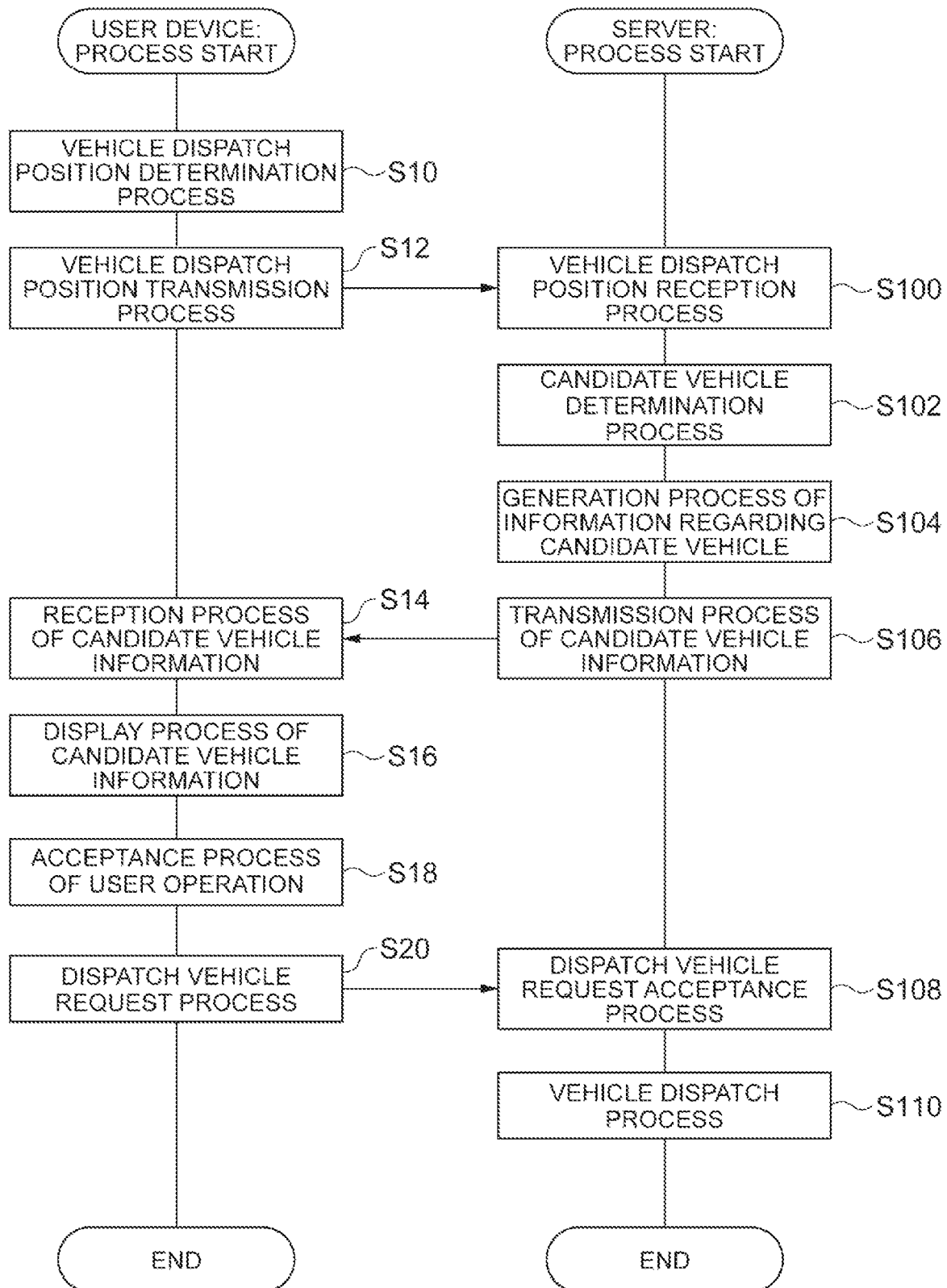
FIG. 7 is a flowchart showing an example of a vehicle dispatch process.

Hereinafter, an example of a vehicle dispatch method is disclosed. FIG. 7 is a flowchart showing the example of the vehicle dispatch process. For example, the flowchart of FIG. 7 is performed in timing when the user device 10 and the server 30 are in activation states and the user starts the vehicle dispatch process on a dispatch application of the user device 10. It is assumed that the server 30 obtains the position of the registered vehicle before the flowchart of FIG. 7 is started.

As shown in FIG. 7, the user device 10 determines the vehicle dispatch position, as a vehicle dispatch position determining process (S10). For example, the user device 10 determines a position in which the user taps on the map displayed on the user interface 105 with their finger, as the vehicle dispatch position.

Subsequently, the vehicle dispatch position transmission unit 11 of the user device 10 transmits the vehicle dispatch position determined in the vehicle dispatch position determining process (S10) to the server 30, as a vehicle dispatch position transmitting process (S12).

The vehicle dispatch position obtaining unit 32 of the server 30 receives the vehicle dispatch position from the user device 10, as a vehicle dispatch position reception process (S100). The candidate vehicle determination unit 34 of the server 30 determines the candidate vehicle among the registered vehicles, as a candidate vehicle determination process (S102). For example, the candidate vehicle determination unit 34 determines the registered vehicle positioned within a predetermined distance range from the vehicle dispatch position, as the candidate vehicle.

Subsequently, the candidate transmission unit 35 of the server 30 obtains the information regarding the autonomous driving function of the candidate vehicle based on the vehicle identification number of the candidate vehicle while referring the storage 303, as an information generation process (S104). Data obtained by associating the vehicle identification number of the candidate vehicle with the information regarding the autonomous driving function is generated.

Subsequently, the candidate transmission unit 35 of the server 30 transmits the data generated in the information generation process (S104) in association with the candidate vehicle to the user device 10, as a transmission process (S106).

The candidate reception unit 13 of the user device 10 receives the information regarding the autonomous driving function of the candidate vehicle in association with the candidate vehicle, as a reception process (S14). Subsequently, the display control unit 14 of the user device 10 displays the information regarding the autonomous driving function of the candidate vehicle received in the reception process (S14) in association with the candidate vehicle on the user interface 105, as a display process (S16) (the screen example G1 of FIG. 5 and the screen example G2 of FIG. 6).

The acceptance unit 15 of the user device 10 accepts a user operation for selecting the dispatch vehicle among the candidate vehicles, as an acceptance process (S18). For example, the acceptance unit 15 accepts an operation for tapping on the candidate vehicle displayed on the user interface 105.

Subsequently, the dispatch vehicle request unit 16 of the user device 10 transmits the information for identifying the dispatch vehicle selected in the acceptance process (S18) to the server 30, as a dispatch vehicle request process (S20). For example, the dispatch vehicle request unit 16 transmits the vehicle identification number to the server 30.

The dispatch vehicle reception unit 36 of the server 30 receives the information for identifying the dispatch vehicle from the user device 10, as a dispatch vehicle request acceptance process (S108). For example, the dispatch vehicle reception unit 36 receives the vehicle identification number of the dispatch vehicle from the user device 10.

The vehicle dispatch processing unit 37 of the server 30 transmits the vehicle dispatch position to the dispatch vehicle, as a vehicle dispatch process (S110). When the vehicle dispatch process (S110) is ended, the flowchart of FIG. 7 is ended.

(Server Program and User Device Program)

A server program and a user device program includes a main module, an input module, and an arithmetic processing module. The main module is a module that generally controls an operation of hardware. The input module operates a computer so as to accept an input from the user. The arithmetic processing module is a module that performs the arithmetic processing. Functions realized by executing the main module, the input module, and the arithmetic processing module are the same as the functions of the user device 10 or the server 30. For example, the server program and the user device program are provided by a non-transitory computer-readable recording medium such as a ROM or a semiconductor memory. The server program and the user device program may be provided via a network.

Conclusion of First Embodiment

According to the vehicle dispatch system 1, the information regarding the autonomous driving function of at least one candidate vehicle is displayed in association with at least one candidate vehicle on the user interface 105 of the user device 10. Thus, the user can determine the dispatch vehicle in consideration of the information regarding the autonomous driving function. Accordingly, this system can select the autonomous driving vehicle as the dispatch vehicle. This system can present the index for determining the reliability of the autonomous driving vehicle to the user by providing the information regarding the autonomous driving function.

Second Embodiment

A vehicle dispatch system 1 according to a second embodiment is different from the vehicle dispatch system 1 according to the first embodiment in that information regarding an autonomous driving function of a candidate vehicle generated by using a destination of the user is presented to the user, and other points are the same. The same contents in the second embodiment as those in the first embodiment are not repeated.

Figure 8:
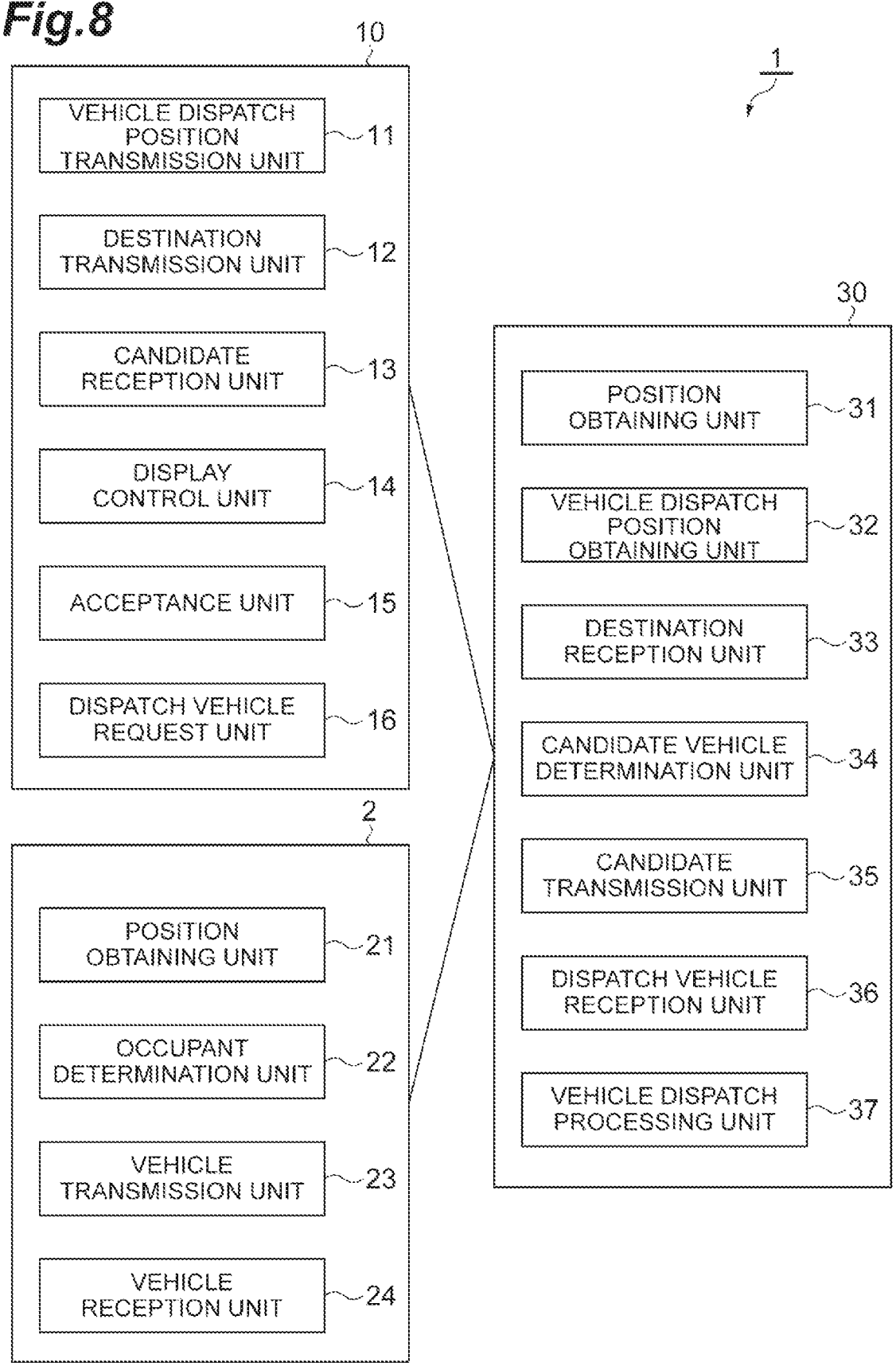
FIG. 8 is a diagram showing an example of a configuration of a vehicle dispatch system according to a second embodiment.

FIG. 8 is a diagram showing an example of a configuration of the vehicle dispatch system 1 according to the second embodiment. As shown in FIG. 8, the user device 10 further includes a destination transmission unit 12. The destination transmission unit 12 transmits the destination to the server 30. The destination transmission unit 12 is mainly realized by the processor 101 that operates the communication interface 104 while referring to the memory 102 and the storage 103. The destination is an intended point of the user. For example, the destination is specified by a user operation. For example, a position in which the user taps on the map displayed on the user interface 105 of the user device 10 with their finger becomes the destination. The destination may be input by using a keyboard. Other functions of the user device 10 are the same as those in the first embodiment.

The server 30 further includes a destination reception unit 33. The destination reception unit 33 receives the destination from the user device 10. The destination reception unit 33 is mainly realized by the processor 301 that operates the communication interface 304 while referring to the memory 302 and the storage 303.

The candidate transmission unit 35 of the server 30 calculates one or a plurality of estimation routes, and an estimation required time from the vehicle dispatch position to the destination based on the vehicle dispatch position, the destination, and the map information. For example, the map information is stored in the storage 303, and information capable of determining whether or not to perform the autonomous driving is embedded. For example, the information capable of determining whether or not to perform the autonomous driving is information (positional information of a lane boundary line, positional information of a pole, traffic regulations, or the like) required in the autonomous driving. On the estimation route, a section in which the information required in the autonomous driving is included is an autonomous driving enabled section, and a section in which the information required in the autonomous driving is not included is an autonomous driving disabled section. Alternatively, on the estimation route, the reliability which is equal to or greater than a predetermined value cannot be secured in a section in which data is insufficient cannot secure, this section may be determined as the autonomous driving disabled section. Alternatively, information indicating whether or not to perform the autonomous driving may be allocated to each section in advance. The candidate transmission unit 35 determines the autonomous driving enabled section or a section in which it is necessary to perform the manual driving for each estimation route, and generates data obtained by associating the information with the candidate vehicle. The candidate transmission unit 35 transmits the generated data to the user device 10. Other functions of the server 30 are the same as those in the first embodiment.

Screen Example

Figure 9:
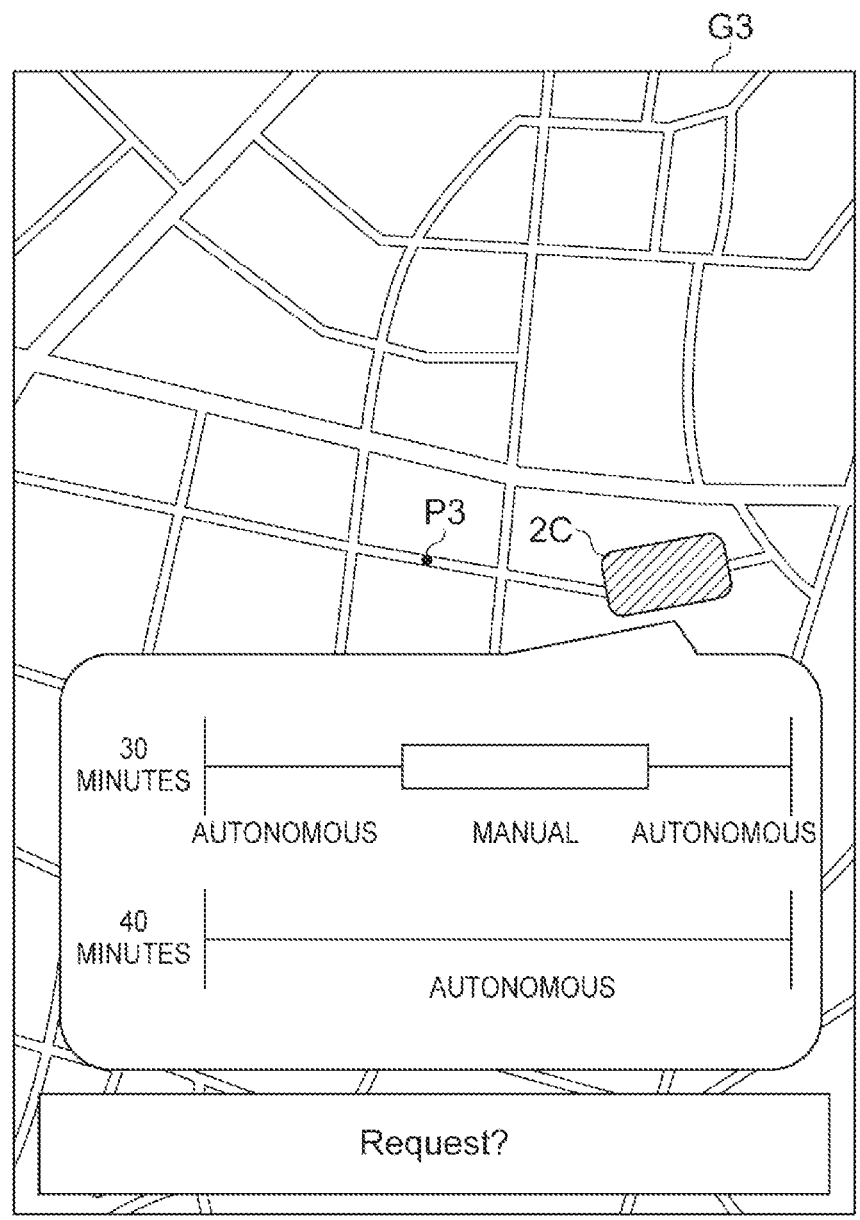
FIG. 9 is a screen example of the user device on which an autonomous driving section of the candidate vehicle is displayed.

FIG. 9 is a screen example G3 of the user device 10 on which the autonomous driving section of the candidate vehicle is displayed. As shown in FIG. 9, the display control unit 14 displays the map. The display control unit 14 adjusts the display of the map so as to display a vehicle dispatch position P3 in the screen center. The display control unit 14 display the candidate vehicle received from the server 30. Here, one candidate vehicle is displayed on the map. The display control unit 14 provides the balloons to the icons of the candidate vehicles, and displays the information items regarding the autonomous driving functions. For example, as the information regarding to the autonomous driving, an estimation required time of a first estimation route "30 minutes", the summary of the autonomous driving section on the first estimation route, an estimation required time of a second estimation route "40 minutes", and the summary of the autonomous driving section on the first estimation route are displayed in the balloon of the vehicle 2C which is the candidate vehicle.

(Vehicle Dispatch Process)

Figure 10:
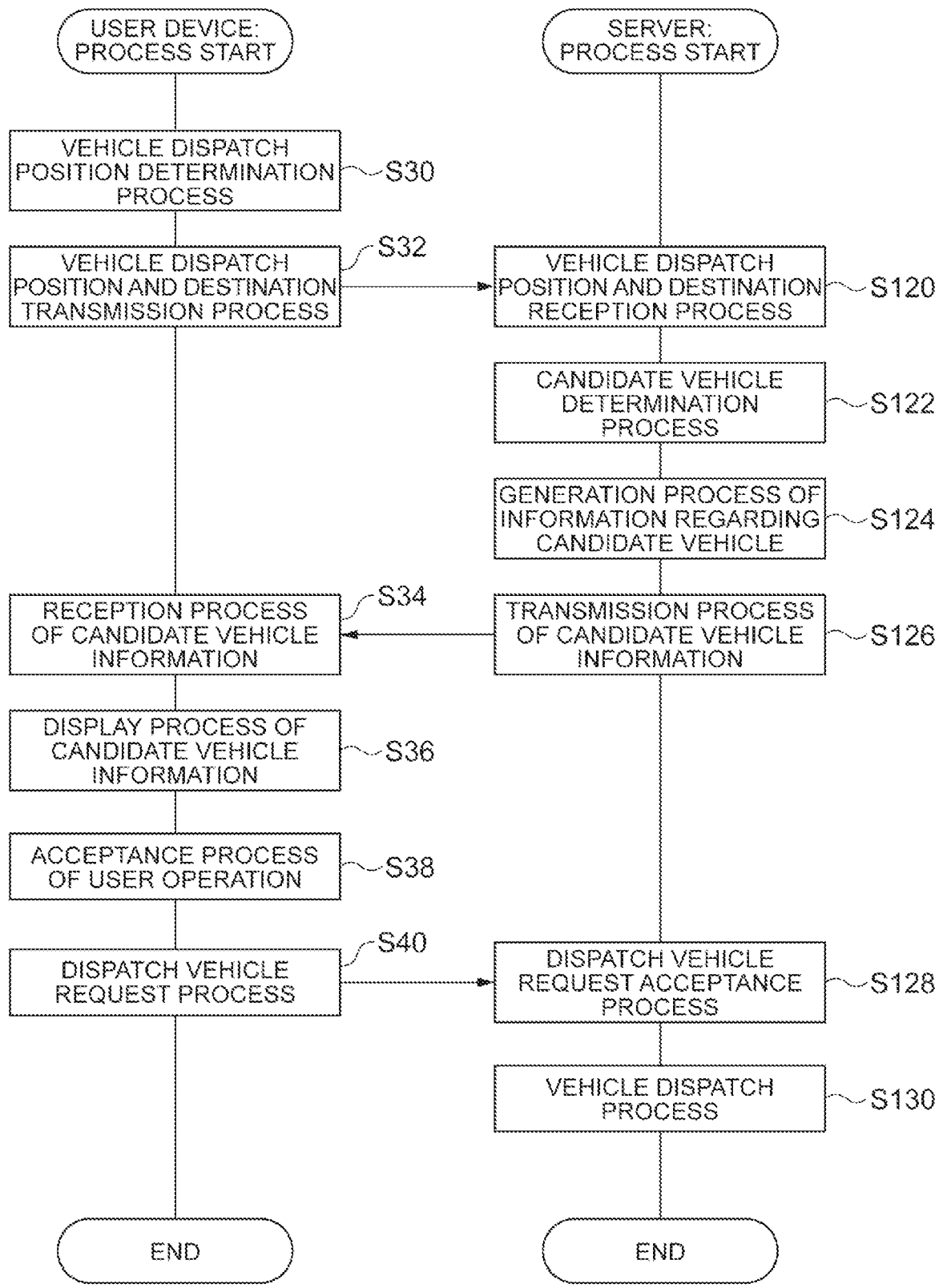
FIG. 10 is a flowchart showing an example of the vehicle dispatch process.

Hereinafter, an example of a vehicle dispatch method is disclosed. FIG. 10 is a flowchart showing an example of the vehicle dispatch process. For example, the flowchart of FIG. 10 is performed in timing when the user device 10 and the server 30 are in the activation states and the user starts the vehicle dispatch process on the vehicle dispatch application of the user device 10. It is assumed that the server 30 obtains the position of the registered vehicle before the flowchart of FIG. 10 is started.

A vehicle dispatch position determination process (S30) of FIG. 10 is the same as the vehicle dispatch position determination process (S10) of FIG. 7.

Subsequently, the vehicle dispatch position transmission unit 11 and the destination transmission unit 12 of the user device 10 transmit the vehicle dispatch position determined in the vehicle dispatch position determination process (S30) and the destination to the server 30, as a transmission process (S32).

The vehicle dispatch position obtaining unit 32 and the destination reception unit 33 of the server 30 receive the vehicle dispatch position and the destination from the user device 10, as a reception process (S120). A candidate vehicle determination process (S122) of FIG. 10 is the same as the candidate vehicle determination process (S102) of FIG. 7.

Subsequently, the candidate transmission unit 35 of the server 30 obtains the information regarding the autonomous driving function of the candidate vehicle based on the vehicle identification number of the candidate vehicle while referring to the storage 303, as an information generation process (S124). Data obtained by associating the vehicle identification number of the candidate vehicle with the information regarding the autonomous driving function is generated. For example, the candidate transmission unit 35 generates data including the plurality of estimation routes, the estimation required time, and a traveling section of the autonomous driving.

Subsequently, the candidate transmission unit 35 of the server 30 transmits the data generated in the information generation process (S124) in association with the candidate vehicle to the user device 10, as a transmission process (S126).

The candidate reception unit 13 of the user device 10 receives the information regarding the autonomous driving function of the candidate vehicle in association with the candidate vehicle, as a reception process (S34). Subsequently, the display control unit 14 of the user device 10 displays the information regarding the autonomous driving function of the candidate vehicle received in the reception process (S34) in association with the candidate vehicle on the user interface 105, as a display process (S36) (the screen example G3 of FIG. 9).

A reception process (S38), a vehicle dispatch request process (S40), a dispatch vehicle request acceptance process (S128), and a vehicle dispatch process (S130) of FIG. 10 which are performed afterwards are the same as the acceptance process (S18), the vehicle dispatch request process (S20), the dispatch vehicle request acceptance process (S108), and the vehicle dispatch process (S110) of FIG. 7.

Conclusion of Second Embodiment

According to the vehicle dispatch system 1, the estimation route is calculated based on the destination, and the traveling section in which the autonomous driving function can be demonstrated is displayed for each estimation route. Thus, this system can provide more detailed information regarding the autonomous driving function to the user.

Third Embodiment

A vehicle dispatch system 1 according to a third embodiment is different from the vehicle dispatch system 1 according to the first embodiment in that an authentication function is added, and other points are the same. The same contents in the third embodiment as those in the first embodiment are not repeated.

Figure 11:
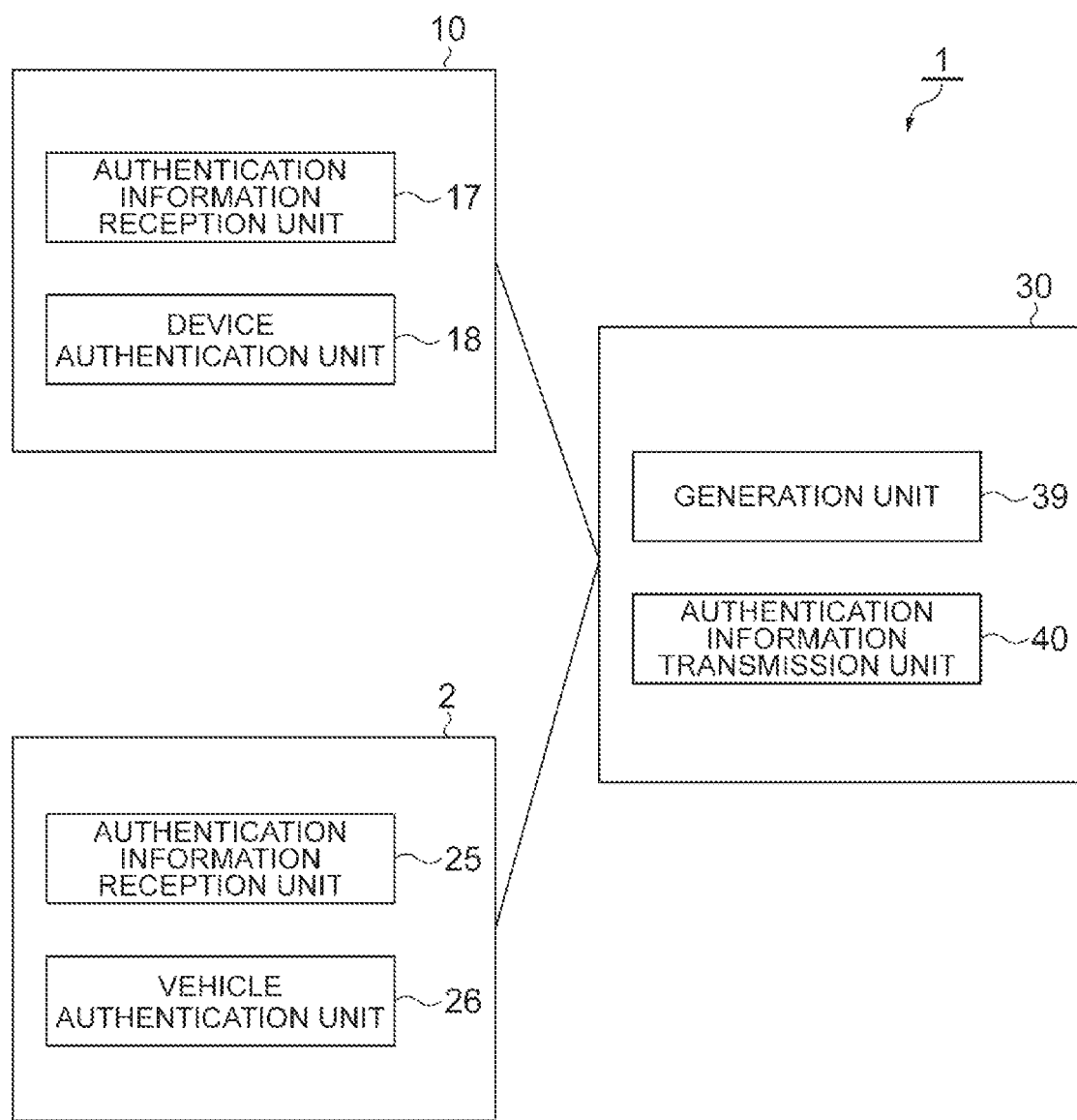
FIG. 11 is a block diagram showing an example of an authentication function of a vehicle dispatch system according to a third embodiment.

FIG. 11 is a block diagram showing an example of the authentication function of the vehicle dispatch system 1 according to the third embodiment. As shown in FIG. 11, the user device 10 further includes an authentication information reception unit 17 and a device authentication unit 18. The server 30 further includes a generation unit 39 and an authentication information transmission unit 40. The vehicle 2 further includes an authentication information reception unit 25 and a vehicle authentication unit 26.

When the vehicle dispatch process of FIG. 7 or FIG. 10 is ended, the generation unit 39 of the server 30 generates authentication information. The generation unit 39 is mainly realized by the processor 301 operated while referring to the memory 302 and the storage 303. The authentication information is information for authenticating combination of the user device that transmits the information for identifying the dispatch vehicle and the dispatch vehicle. The authentication information is transmitted to both the dispatch vehicle and the user device that requests the dispatch vehicle, and authentication is performed by comparing the information obtained between the dispatch vehicle and the user device with the information received from the server 30.

The authentication information may be provided as an image recognizable code so as to be easily read from the user device 10 or the vehicle 2.

The authentication information transmission unit 40 transmits the authentication information generated by the generation unit 39 to the user device that transmits the information identifying the dispatch vehicle and the dispatch vehicle. The authentication information transmission unit 40 is mainly realized by the processor 301 that operates the communication interface 304 while referring to the memory 302 and the storage 303.

The authentication information reception unit 17 of the user device 10 receives the authentication information from the server 30. The authentication information reception unit 17 is mainly realized by the processor 101 that operates the communication interface 104 while referring to the memory 102 and the storage 103.

The device authentication unit 18 of the user device 10 authenticates the combination by using the authentication information received by the authentication information reception unit 17 and the authentication information obtained from the dispatch vehicle. A method of obtaining authentication information from the dispatch vehicle will be described below. The device authentication unit 18 is mainly realized by the processor 101 operated while referring to the memory 102 and the storage 103. When the authentication information items match each other, the device authentication unit 18 authenticates that the combination is correct.

The authentication information reception unit 25 of the vehicle 2 receives the authentication information from the server 30. The authentication information reception unit 25 is mainly realized by the processor 201 that operates the communication interface 204 while referring to the memory 202 and the storage 203.

The vehicle authentication unit 26 of the vehicle 2 authenticates the combination by using the authentication information received by the authentication information reception unit 25 and the authentication information obtained from the user device 10. A method of obtaining the authentication information from the user device 10 will be described below. The vehicle authentication unit 26 is mainly realized by the processor 201 operated while referring to the memory 202 and the storage 203.

When the authentication information items match each other, the vehicle authentication unit 26 authenticates that the combination is correct.

(Interaction Between User Device and Dispatch Vehicle)

An example of the method of obtaining the authentication information in the user device 10 is disclosed. The dispatch vehicle displays the authentication information on a side surface of the vehicle. For example, the displayed authentication information is a computer-readable code. The user device 10 reads the code displayed on the side surface of the dispatch vehicle by using an image sensor such as a camera or a dedicated reader. Accordingly, the user device 10 can directly the authentication information from the dispatch vehicle.

An example of the method of obtaining the authentication information from the user device 10 in the dispatch vehicle is disclosed. The user device 10 displays the authentication information on the user interface 105. For example, the authentication information to be displayed is a computer-readable code. The dispatch vehicle reads the code displayed on the user interface 105 of the user device 10 by using an image sensor such as a camera or a dedicated reader. Accordingly, the dispatch vehicle can directly obtain the authentication information from the user device 10.

(Authentication Process)

Figure 12:
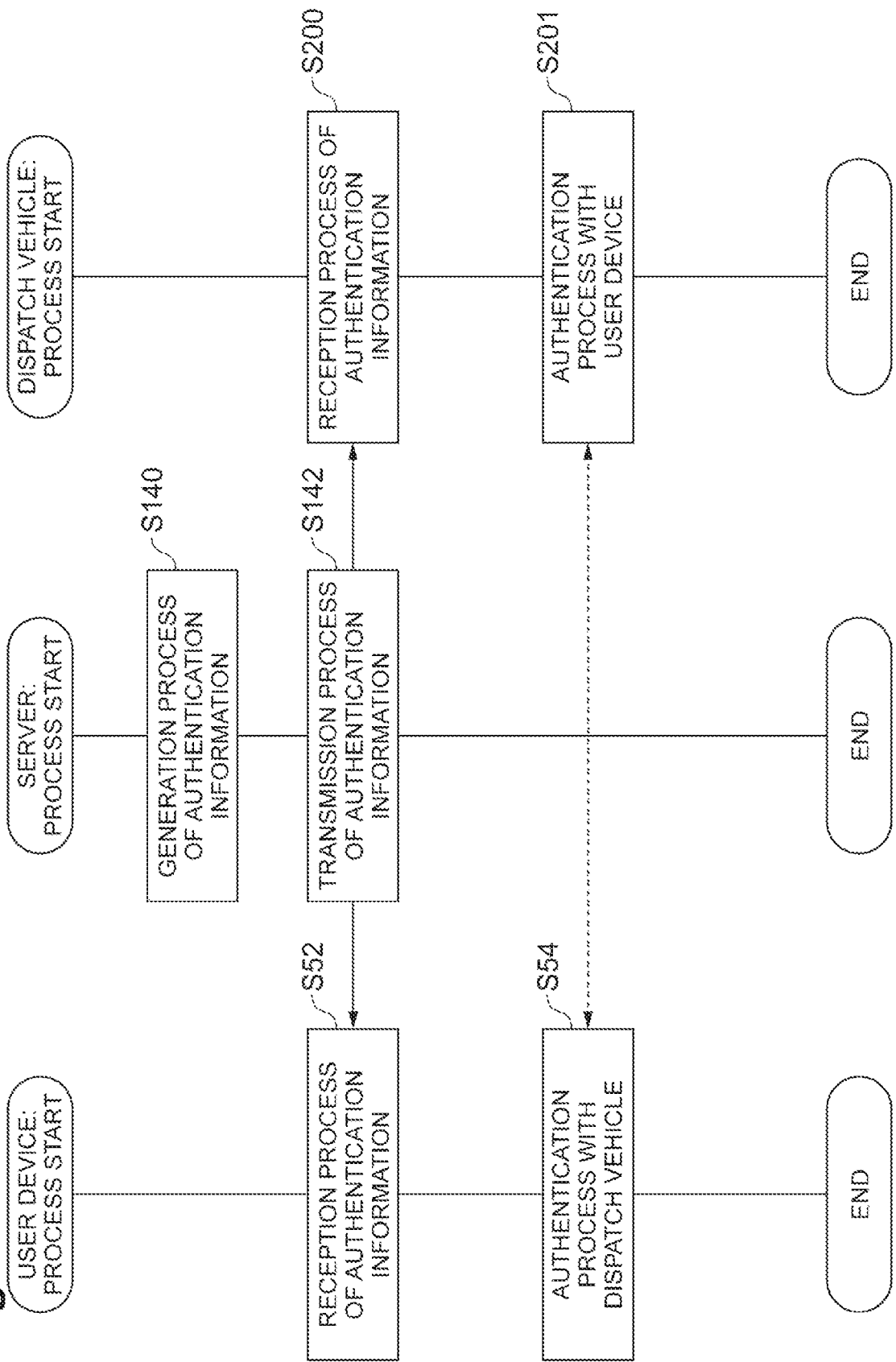
FIG. 12 is a flowchart showing an example of an authentication process.

Hereinafter, an example of an authentication method is disclosed. FIG. 12 is a flowchart showing an example of an authentication process. For example, the flowchart of FIG. 12 is performed in timing when the vehicle dispatch process shown in FIG. 7 or 10 is ended.

As shown in FIG. 12, the generation unit 39 of the server 30 generates the authentication information, as a generation process (S140). Subsequently, the authentication information transmission unit 40 of the server 30 transmits the authentication information generated in the generation process (S140) to the user device that transmits the information for identifying the dispatch vehicle and the dispatch vehicle, as a transmission process (S142).

The authentication information reception unit 17 of the user device 10 receives the authentication information from the server 30, as a reception process (S52). The authentication information reception unit 25 of the dispatch vehicle receives the authentication information from the server 30, as a reception process (S200).

The device authentication unit 18 of the user device 10 authenticates the combination by using the authentication information received in the reception process (S52) and the authentication information obtained from the dispatch vehicle, as an authentication process (S54). The vehicle authentication unit 26 of the dispatch vehicle authenticates the combination by using the authentication information received in the reception process (S200) and the authentication information obtained from the user device 10, as an authentication process (S201).

When the authentication process (S54) and the authentication process (S201) are ended, the flowchart shown in FIG. 12 is ended. Any one of the authentication process (S54) and the authentication process (S201) may be performed, and the other thereof may not be performed.

Conclusion of Third Embodiment

At least one of the user device 10 and the dispatch vehicle of the vehicle dispatch system 1 can authenticate the combination of the dispatch vehicle and the user device by using the authentication information.

Fourth Embodiment

A vehicle dispatch system 1 according to a fourth embodiment is different from the vehicle dispatch system 1 according to the third embodiment in that a part of the authentication function is different, and other points are the same. The same contents in the fourth embodiment as those in the third embodiment are not repeated.

Figure 13:
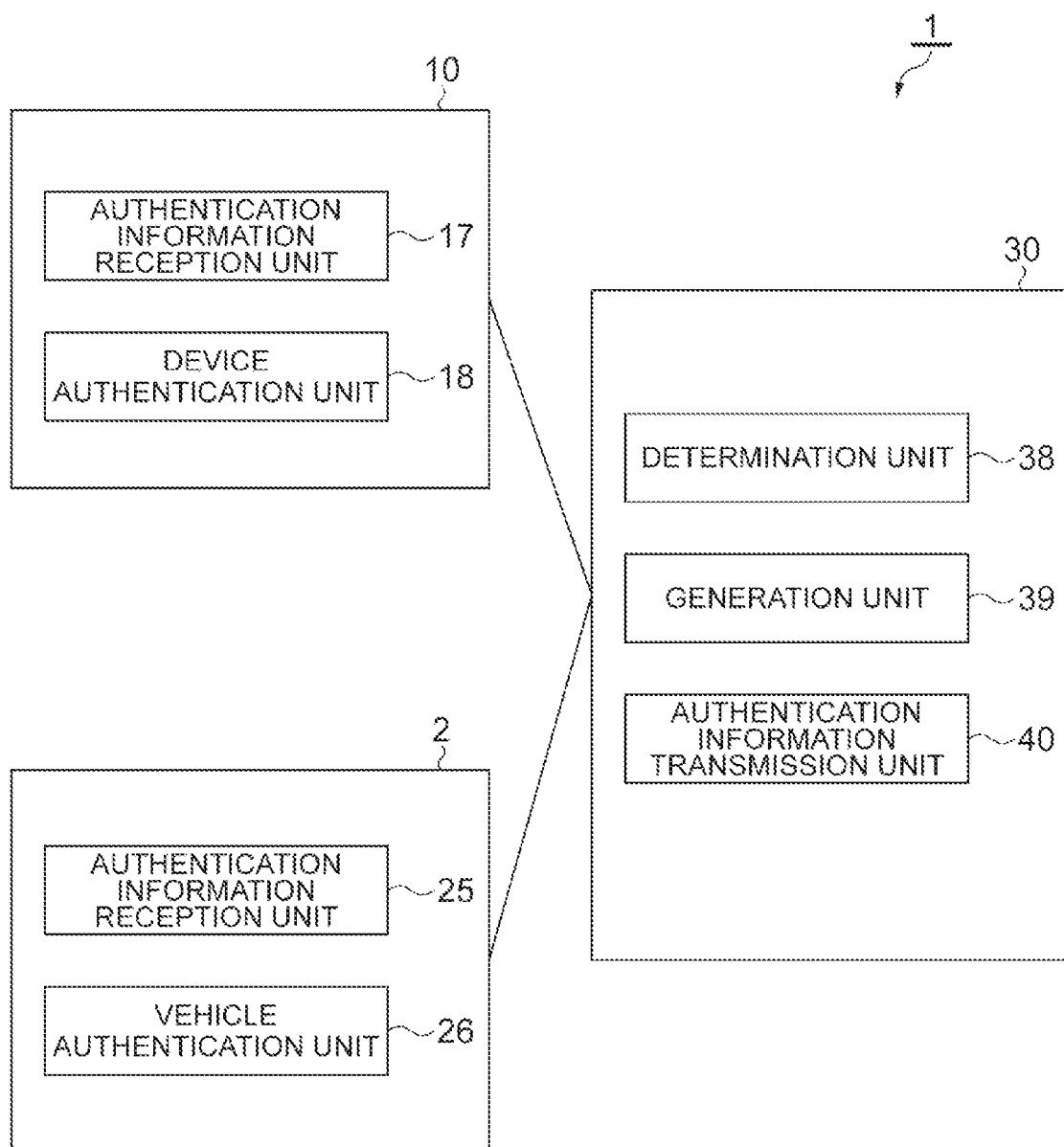
FIG. 13 is a block diagram showing an example of an authentication function of a vehicle dispatch system according to a fourth embodiment.

FIG. 13 is a block diagram showing an example of an authentication function of the vehicle dispatch system 1 according to the fourth embodiment. As shown in FIG. 13, the server 30 further includes a determination unit 38.

When the vehicle dispatch process of FIG. 7 or 10 is ended, the determination unit 38 of the server 30 determines whether or not the dispatch vehicle at the time of dispatching the vehicle is a manned vehicle. The determination unit 38 is mainly realized by the processor 301 operated while referring to the memory 302 and the storage 303. For example, the determination unit 38 reads the seating state of the driver of the dispatch vehicle, and determines whether or not the dispatch vehicle is the manned vehicle while referring to the storage 303. That is, whether or not the dispatch vehicle is the manned vehicle means whether or not the driver is seated on the driver seat.

When the determination unit 38 determines that the dispatch vehicle at the time of dispatching the vehicle is the manned vehicle, the generation unit 39 of the server 30 does not generate the authentication information. The generation unit 39 generates information for confirming that the combination thereof is correct through conversation between the driver and the user instead of the authentication information, and presents the generated information to both the driver and the user. Information of the dispatch vehicle and information of the user are used as an example of such information. For example, the vehicle identification number of the dispatch vehicle, the vehicle type, and the information of the driver are used as the information of the dispatch vehicle. For example, a user ID, user device specific information (telephone number, fixed address, or the like) are used as the information of the user.

The authentication information transmission unit 40 transmits the information of the dispatch vehicle to the user device 10, and transmits the information of the user to the dispatch vehicle. In this case, the device authentication unit 18 of the user device 10 and the vehicle authentication unit 26 of the vehicle 2 do not perform authentication operations. Other configurations are the same as those in the third embodiment.

(Authentication Process)

Figure 14:
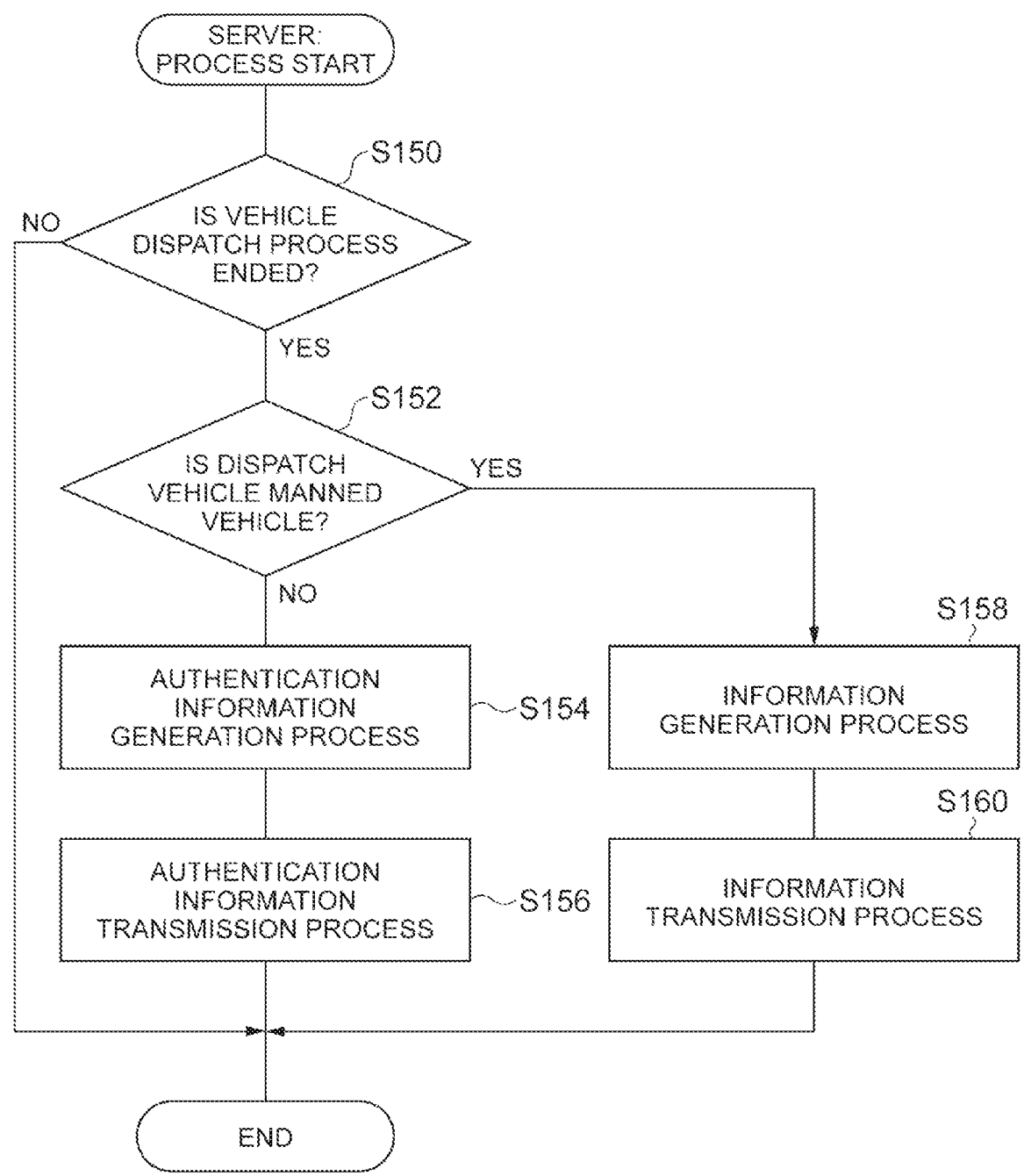
FIG. 14 is a flowchart showing an example of the authentication process.

Hereinafter, an example of an authentication method is disclosed. FIG. 14 is a flowchart showing an example of the authentication process. For example, the flowchart of FIG. 14 is performed simultaneously with the vehicle dispatch process shown in FIG. 7 or 10.

As shown in FIG. 14, the server 30 determines whether or not the vehicle dispatch process shown in FIG. 7 or 10 is ended, as a determination process (S150). When the vehicle dispatch process shown in FIG. 7 or 10 (S150: YES), the determination unit 38 of the server 30 determines whether or not the dispatch vehicle at the time of dispatching the vehicle is the manned vehicle, as a determination process (S152).

When it is determined that the dispatch vehicle at the time of dispatching the vehicle is the manned vehicle (S152: YES), the generation unit 39 of the server 30 generates the information of the dispatch vehicle and the information of the user, as an information generation process (S158). The authentication information transmission unit 40 of the server 30 transmits the information of the dispatch vehicle to the user device 10 and transmits the information of the user to the dispatch vehicle, as a transmission process (S160). Accordingly, it is possible to confirm that the combination thereof is correct through the conversation between the driver and the user.

When it is determined that the dispatch vehicle at the time of dispatching the vehicle is the unmanned vehicle (S152: NO), the authentication information generation process (S154) and the authentication information transmission process (S156) are performed. The authentication information generation process (S154) and the authentication information transmission process (S156) are the same as the generation process (S140) and the transmission process (S142) of FIG. 12. That is, the authentication process (S54) and the authentication process (S201) of FIG. 12 are performed after the authentication information generation process (S154) and the authentication information transmission process (S156) are performed.

When the vehicle dispatch process of FIG. 7 or FIG. 10 is not ended (S150: NO) and the authentication information generation process (S154) is ended, if the transmission process (S160) is ended, the flowchart shown in FIG. 14 is ended.

Conclusion of Fourth Embodiment

When the dispatch vehicle at the time of dispatching the vehicle is the manned vehicle, the vehicle dispatch system 1 can authenticate the combination between the occupant and the user.

The above-described embodiment can be performed in various aspects obtained by performing various changes and modifications based on the knowledge of those skilled in the art.

The vehicle dispatch system 1 does not need to include the plurality of user devices and the plurality of vehicles, and may include only one user device and one vehicle.

While it has been described that the vehicle 2 and the user device 10 are connected to the server 30 through the same network N, the vehicle and the user device may be connected to the server 30 through networks different from each other.

What is claimed is:

1. A vehicle dispatch system comprising a server, and a user device capable of communicating with the server,
   the server comprising a storage unit configured to store information regarding autonomous driving of a plurality of registered vehicles and a first processor, the first processor programmed to:
   obtain positions of the plurality of registered vehicles;
   obtain a vehicle dispatch position from the user device;
   determine at least one vehicle among the plurality of registered vehicles based on the vehicle dispatch position and the positions of the plurality of registered vehicles;
   transmit information regarding an autonomous driving of the at least one vehicle in association with the at least one vehicle to the user device while referring to the storage unit; and
   transmit the vehicle dispatch position to the at least one vehicle, and
   the user device comprising a display unit and a second processor, the second processor programmed to:
   transmit the vehicle dispatch position to the server;
   receive the information regarding the autonomous driving of the at least one vehicle in association with the at least one vehicle from the server;
   display the received information regarding the autonomous driving of the at least one vehicle in association with the at least one vehicle, on the display unit; and
   wherein the first processor is further programmed to dispatch the at least one vehicle to the vehicle dispatch position, and
   wherein the information regarding the autonomous driving of the at least one vehicle includes a driving state indicating whether the at least one vehicle is in the autonomous driving, and occupant information indicating whether the at least one vehicle is manned.

2. The vehicle dispatch system according to claim 1, wherein the information regarding the autonomous driving of the at least one vehicle includes information indicating whether an occupant is seated in the driver's seat.

3. The vehicle dispatch system according to claim 1, wherein the information regarding the autonomous driving of the at least one vehicle includes information indicating whether the autonomous driving function is present.

4. A vehicle dispatch method comprising:
   obtaining positions of the plurality of registered vehicles;
   obtaining a vehicle dispatch position from a user device;
   determining at least one vehicle among the plurality of registered vehicles based on the vehicle dispatch position and the positions of the plurality of registered vehicles;
   transmitting information regarding an autonomous driving of the at least one vehicle in association with the at least one vehicle to the user device;

displaying the information regarding the autonomous driving of the at least one vehicle in association with the at least one vehicle, on the user device;

transmitting the vehicle dispatch position to the at least one vehicle; and dispatching the at least one vehicle to the vehicle dispatch position, wherein the information regarding the autonomous driving of the at least one vehicle includes a driving state indicating whether the at least one vehicle is in the autonomous driving, and occupant information indicating whether the at least one vehicle is manned.

5. The vehicle dispatch method according to claim 4, wherein the information regarding the autonomous driving of the at least one vehicle includes information indicating whether an occupant is seated in the driver's seat.

6. The vehicle dispatch method according to claim 4, wherein the information regarding the autonomous driving of the at least one vehicle includes information indicating whether the autonomous driving function is present.

7. One or more non-transitory computer readable media having stored thereon instructions which, when executed by at least one processor, cause the at least one processor to execute processing comprising:

obtaining positions of the plurality of registered vehicles;

obtaining a vehicle dispatch position from a user device;

determining at least one vehicle among the plurality of registered vehicles based on the vehicle dispatch position and the positions of the plurality of registered vehicles;

transmitting information regarding an autonomous driving of the at least one vehicle in association with the at least one vehicle to the user device;

displaying the information regarding the autonomous driving of the at least one vehicle in association with the at least one vehicle, on the user device;

transmitting the vehicle dispatch position to the at least one vehicle; and dispatching the at least one vehicle to the vehicle dispatch position, wherein the information regarding the autonomous driving of the at least one vehicle includes a driving state indicating whether the at least one vehicle is in the autonomous driving, and occupant information indicating whether the at least one vehicle is manned.

8. The non-transitory computer readable media according to claim 7, wherein the information regarding the autonomous driving of the at least one vehicle includes information indicating whether an occupant is seated in the driver's seat.

9. The non-transitory computer readable media according to claim 7, wherein the information regarding the autonomous driving of the at least one vehicle includes information indicating whether the autonomous driving function is present.

* * * * *